Oct. 6, 1964   H. W. BUDENBENDER   3,151,357
EXTRUDER CORE TUBES
Filed April 29, 1963

INVENTOR
H. W. BUDENBENDER
BY
ATTORNEY

3,151,357
EXTRUDER CORE TUBES
Henry W. Budenbender, Cicero, Ill., assignor to Western Electric Company, Incorporated, New York, N.Y., a corporation of New York
Filed Apr. 29, 1963, Ser. No. 276,475
5 Claims. (Cl. 18—13)

The present invention relates generally to extruder core tubes, and more particularly to core tubes for extrusion apparatus wherein material is extruded through a die to form a covering around a filament having a highly viscous coating already formed therearound.

In the manufacturing of certain types of heavy duty cables for use in communication installations, a protective covering of a plastic material, such as polyethylene, is applied by means of an extrusion machine around a cable core already having a highly viscous coating, such as a flooding compound, formed therearound. The highly viscous coating is necessary to provide a moisture seal about the cable core, and the plastic covering is provided for insulative and protective purposes. Such an extrusion machine is generally provided with a core tube through which the cable core advances, and which cooperates with a die to form an annular passage for the plastic material as it is extruded, the die serving to shape the material into a covering around the advancing cable core.

With conventional core tubes, there is a tendency for some of the flooding compound and the plastic material to adhere to the core tube at the inner and outer diameters, respectively, of the exit end thereof. It is believed that the depositing of some of the plastic material and flooding compound on the core tube is caused by the sudden release of pressure as the plastic material and the core emerge from the die and core tube into the atmosphere.

The material so deposited on the core tube usually builds up into a large toroidal shaped mass at both the inner and outer diameters of the exit end thereof, which masses eventually break loose from the core tube and adhere to the cable core as large inclusions beneath the freshly extruded covering. This effect is termed "drooling" in the extrusion art, and the inclusion which is deposited beneath the freshly extruded covering is called "drool." This drool is manifestly undesirable because it often penetrates the outer covering of the cable and results in the necessity of scrapping substantial lengths of cable.

An object of the invention is to provide new and improved extruder core tubes. Another object of the invention is to provide new and improved extruder core tubes for extrusion apparatus wherein material is extruded through an annular passage defined between the core tube and a die to form a covering around a filament having a highly viscous coating already formed therearound.

A further object of the invention is to provide new and improved extruder core tubes for cooperating with a die to extrude a covering of plastic material around a cable core, having a highly viscous coating already formed therearound, as the core advances through a bore in the core tube, wherein the core tube prevents the plastic material and highly viscous coating from adhering to the core tube and building up into a large mass in such a way that it may break off as large inclusions and penetrate the freshly extruded covering.

A core tube accomplishing these and other objects in accordance with the invention may include a body member having formed therethrough a bore through which a filament may be advanced, and having an outer surface shaped to cooperate with a die in extruder apparatus to form an annular passage through which material may be extruded around the filament. Such core tube may be provided with an annular groove in the exit end thereof, defined by a surface which intersects both the bore and the outer surface of the body member at acute angles.

In accordance with a preferred embodiment of the invention an extruder core tube of the above design is provided for cooperating with an extruder die to form coverings of insulating materials around cable cores of indefinite length having highly viscous coatings already formed therearound. The groove in the body member preferably is generally V-shaped in configuration and the surfaces defining the grooves intersect at acute angles the bore and the outer surface of the body member to present sharp edges in the direction of core travel. The outer and inner surfaces of the body member preferably comprise polished chromium to facilitate the flow of the contacting material, while the surfaces defining the groove comprise unpolished steel which retards the flow of the contacting material.

Because of the sharp edges at the inner and outer diameters of the exit end of the body member, any material that adheres to the core tube will curl around such edges and interact with the walls of the groove or with other deposits to break away quickly from the core tube. With dissimilar metals comprising the groove and the initial contacting surfaces of the body member, the disparity in flow rates resulting therefrom also facilitates breaking off of the drool. Consequently, the resulting inclusions beneath the freshly extruded covering are very small in size and thus are harmless. More specifically, they are too small to penetrate the outer covering.

Other objects, advantages and aspects of the invention will appear from the following detailed description of a specific embodiment thereof, when taken in conjunction with the appended drawings in which.

Figure 1:
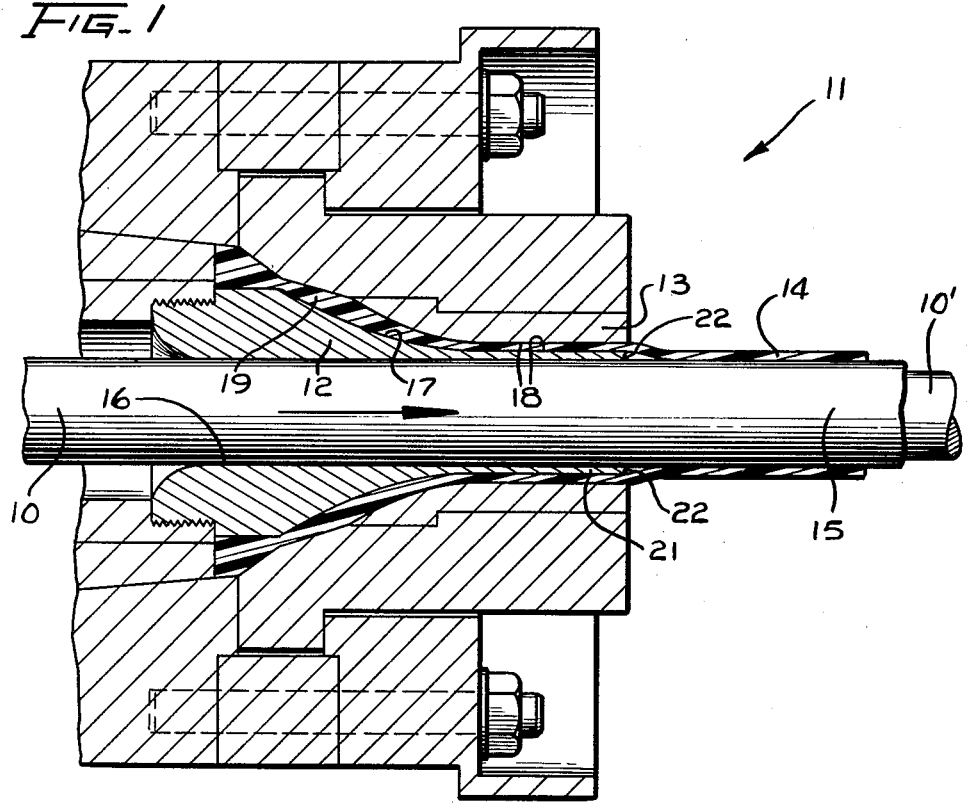
FIG. 1 is an elevational view, partly in section, of an extruder head for extruding a covering over a cable core having a highly viscous coating already formed therearound.

Referring now in detail to the drawings, there is illustrated a specific embodiment of the invention in which a cable core 10 is advanced through an extruder head 11 wherein a core tube 12 guides the core 10 so that it remains concentric within an extruder die 13. The core tube 12 also cooperates with the extruder die 13 to form an annular passage through which a plastic material, such as polyethylene, is extruded around the core 10. The cable core 10 is then passed through a water bath (not shown) where the hot, freshly extruded covering 14 cools, and is subsequently rewound on a take-up reel (not shown).

The particular cable core 10 involved includes a core 10′ previously coated with a highly viscous material 15 which remains in such state at least throughout the extruding operaton. Such a material utilized in the communications cable industry is one called "flooding compound" which provides a moisture seal about the core and which remains in a highly viscous state indefinitely to facilitate bending of the cable in its completed form. The term "highly viscous" is intended to include materials of sufficient viscosity to retain their shape as a coating about a core though remaining in a semi-plastic state. The cable core 10 is advanced through a bore 16 in the core tube 12, and the outer surface 17 of the core tube 12 is generally bell-shaped in configuration so as to cooperate with the die 13 in defining an annular passage 18 through which the plastic material 19 is extruded to form the covering 14 around the core 10.

The exit end 21 of the core tube 12 is provided with an annular, generally V-shaped groove 22 defined by surfaces which intersect the bore 16 and the outer surface 17 of the core tube 12 at acute angles. Such intersections thus define sharp edges 23 and 24, depicted in FIGS. 2 and 3, projecting in the direction of core travel at the inner and outer diameters, respectively, of the exit end 21 of the core tube 12. It is preferred that the core tube 12 be plated with chromium and be highly polished to facilitate flow of contacting material over the bore-defining and outer surfaces thereof. It is further preferred that the V-shaped groove 22 be ground in the core tube after such plating operation so that the surfaces defining the groove are composed of the original metal of the core tube, which is generally steel, and are unpolished so as to retard flow of material in contact therewith.

Figure 2:
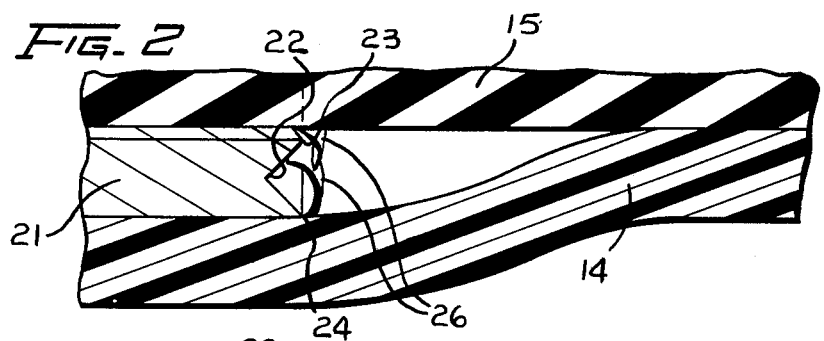
FIG. 2 is a fragmentary enlarged sectional view of the exit end of the core tube depicting the interaction of deposits adhering thereto.
Figure 3:
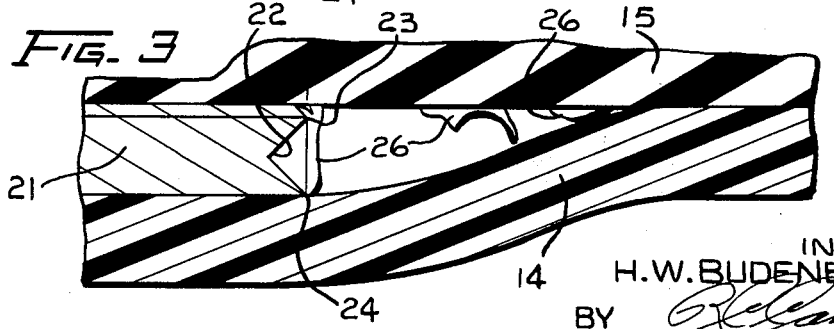
FIG. 3 is a fragmentary enlarged sectional view similar to that in FIG. 2 and illustrating the deposits as they break away from the core tube and become harmless inclusions beneath a freshly extruded covering.

As pointed out above, both the flooding compound and the freshly extruded plastic characteristically adhere to ordinary core tubes at the exit end thereof and accumulate into large deposits which eventually break off and result in large inclusions possibly penetrating the outer covering. The sharp edges 23 and 24 formed by the intersections of the surfaces defining the groove 22 with the surfaces defining inner and outer diameters at the exit end of the core tube, substantially eliminate this problem. The deposits 26—26 which tend to form, curl around such edges, as shown in FIGS. 2 and 3, and interact with each other or with the walls of the groove 22, tending to break away from the core tube 12 as a result of such interaction.

Such breaking away of the deposits 26—26 is further facilitated by the use of dissimilar metals at the initial contacting surfaces of the core tube (the bore-defining and outer surfaces thereof) and the walls of the groove 22. Since the highly polished chromium surfaces defining the bore 16 and the outer surface 17 of the core tube 12 facilitate the flow of contacting material, and since the unpolished steel surfaces defining the groove 22 retard the flow of contacting material, the resulting dissimilar flow rates as the material curls around the edges 23 and 24 and into the groove 22 facilitates breaking away of the deposits. The deposits, therefore, tend to accumulate at the sharp edges of the core tube, and thus tend to adhere to the coating on the cable core and the freshly extruded covering therearound.

As a result, any deposits which tend to accumulate at the exit end of the core tube curl around the edges 23 and 24 and into the groove 22 by the edges 23 and 24, where they are rapidly broken away by the interaction of the deposits formed at the inner edge 23 and outer edge 24. This breaking away of the drool is facilitated by the polished and unpolished dissimilar metals which give rise to the dissimilar flow rates as the deposits enter the groove 22. Consequently such deposits do not accumulate to any size and break away as harmless inclusions beneath the freshly extruded covering.

While one specific embodiment is described in detail hereinabove, various modifications may be made without departing from the spirit and scope of the invention and it is intended that all such modifications be interpreted as contemplated by the invention.

What is claimed is:

1. In apparatus for extruding a covering around a filament having a highly viscous coating already formed therearound, the combination comprising:
   an extruder die; and
   a core tube having a bore through which the coated filament may be advanced and an outer surface cooperable with said die to form an annular passage through which a material may be extruded to form the covering;
   the surface at the exit end of the core tube defining an annular groove which intersects the outer surface of the core tube and the bore-defining surface of the core tube at acute angles.

2. In apparatus for extruding a covering of insulating material around conductors of indefinite length having a highly viscous coating already formed therearound, the combination comprising:
   an extruder die; and
   a core tube;
   said core tube comprising a body member having a bore through which a coated conductor may be advanced and having an outer surface shaped to coopperate with said die to form an annular passage through which material may be extruded around the conductor, said body member being provided with an annular groove in the exit end thereof defined by a surface which intersects the bore-defining surface of said body member and the outer surface of said body member at acute angles.

3. The combinaton as recited in claim 2, wherein:
   the extruding apparatus forms a covering of insulating material around a cable core of indefinite length having a highly viscous coating already formed therearound; and
   the groove in the exit end of the core tube is generally V-shaped in configuration so as to present sharp edges in the direction of core travel;
   whereby drool at the inner and outer edges of the groove interacts to break off as harmless inclusions beneath the outer covering.

4. The combination as recited in claim 2, wherein:
   the inner surface of the body member defining the bore and the outer surface of the body member are polished, to facilitate flow of the contacting material; and
   the surface defining the groove in the core tube is unpolished to retard the flow of the contacting material;
   whereby the dissimilar flow rates as the material leaves the polished surfaces and contacts the unpolished surface facilitates breaking off of the drool.

5. The combination as recited in claim 2, wherein:
   the inner surface of the body member defining the bore and the outer surface of the body member comprise polished chromium to facilitate the flow of the contacting material; and
   the surface defining the groove in the body member comprises unpolished steel to retard the flow of the contacting material;
   whereby the disparity in flow rates resulting from dissimilar metals as the material leaves the inner and outer surfaces of the core tube and contacts the surface defining the groove, facilitates breaking off of the drool.

References Cited in the file of this patent

UNITED STATES PATENTS

| 2,732,588 | Myers | Jan. 31, 1956 |
| 3,024,494 | Szkila | Mar. 13, 1962 |

FOREIGN PATENTS

| 592,179 | France | Apr. 20, 1925 |